Feb. 11, 1936.  W. M. BRADSHAW ET AL  2,030,094
METER MOUNTING
Filed Sept. 13, 1934
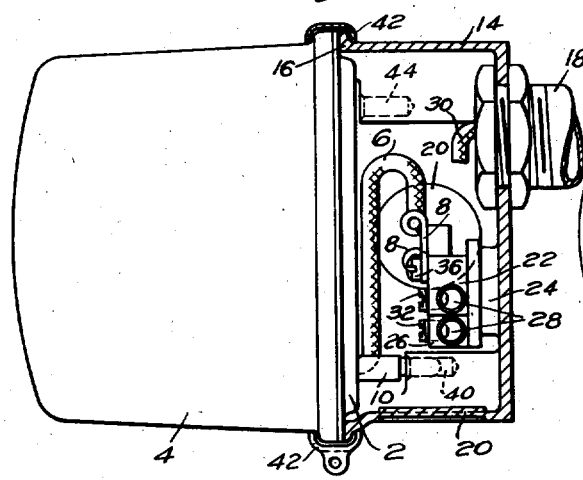
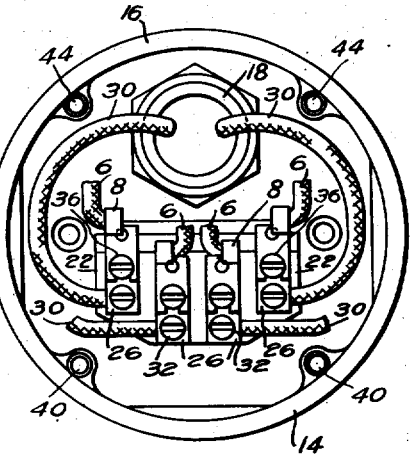
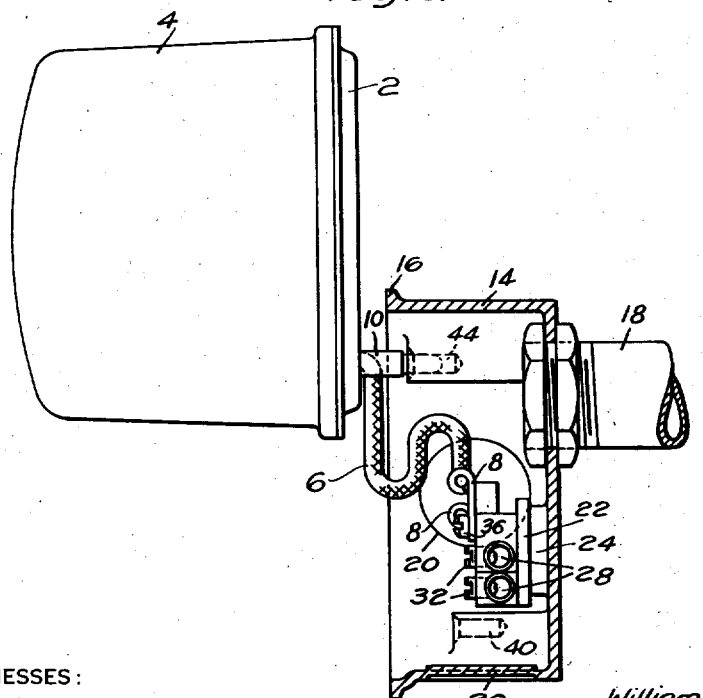
WITNESSES:
INVENTORS.
William M. Bradshaw
and Walter G. Mylius.
BY
ATTORNEY Patented Feb. 11, 1936

2,030,094

UNITED STATES PATENT OFFICE 2,030,094

METER MOUNTING

William M. Bradshaw and Walter G. Mylius, Summit, N. J., assignors to Westinghouse Electric & Manufacturing Company, East Pittsburgh, Pa., a corporation of Pennsylvania Application September 13, 1934, Serial No. 743,864

3 Claims. (Cl. 247—2)

Our invention relates to watthour meter constructions and particularly to an improved means for mounting a watthour meter to facilitate the testing thereof.

Watthour meters of the general character shown, for example, in Patent No. 1,893,177, issued January 3, 1933, to Mylius and LaBar, are coming into extensive commercial use, but when it is necessary to test such a meter, it must either be removed from service and returned to the laboratory for testing, or a test jack, as shown in Patent No. 1,942,258, issued January 2, 1934, to Mylius and Rutter, must be employed. In view of the fact that in a number of localities it is required that the meter be tested in position without disconnecting it from the circuit being metered, it is necessary that a meter construction be employed to take care of these situations.

It is an object of the present invention, therefore, to devise a meter mounting arrangement wherein the meter may be readily detached if desired, but wherein the meter may be tested in an expeditious manner without removing it from the customer's premises, or disrupting its electrical connections with the circuit being metered.

In practicing the present invention, we have devised a meter mounting of the general appearance shown in the aforesaid Patent No. 1,893,177, but wherein for testing purposes, the meter may be mounted in an auxiliary position on the base receptacle to provide access to the terminal block within said receptacle to facilitate the testing operations.

Referring to the drawing:

Figure 1 is an assembly view, in side elevation, partially in section, of the meter construction embodying our invention;

Fig. 2 is a view in elevation of the base receptacle shown in Fig. 1; and,

Fig. 3 is a view in elevation, partially in section, showing the watthour meter mounted in its auxiliary position on the base receptacle to facilitate the testing operation.

Referring more specifically to the drawing, our invention contemplates a casing for a meter element comprising a base 2 having secured thereto a glass cover 4, and flexible conductors 6 from the meter mechanism extending from the base and terminating in terminal clips 8.

A pair of pins 10 project from the base 2, at right angles thereto, adjacent the lower section of the base as viewed in the drawing.

The support for the meter comprises a base receptacle or terminal chamber 14 having a peripheral flange 16 of substantially the same diameter as the meter base 2 and which is adapted to engage the circumferential edge of the base. In practice, a felt washer or the like may be inserted between the engaging faces, if desired, but it is not shown in the drawing in the interest of simplification.

The terminal chamber 14 is substantially of cup-shape and is similar in appearance and construction to an outlet box or junction box having a conduit connection 18 and a plurality of knockouts 20.

A terminal block 22 is secured on an upstanding boss 24 on the base of the terminal box although obviously it may be secured in any suitable manner. The terminal block 22 carries a plurality of terminals 26 which are embedded in the exposed face of the block 22. A laterally extending aperture 28 is provided in each terminal 26 for receiving the ends of conductors 30, and the conductor ends are secured therein by means of screws 32.

Referring more specifically to Fig. 2, the four leads 30 from the circuit to be metered are brought through the conduit fitting 18 into the terminal chamber and are respectively inserted in the four apertures 28. The bare ends of the conductors 30 are engaged by the terminal screws 32 to make electrical contact with the terminals 26.

The ends of the terminal clips 8 are slotted to partially surround terminal screws 36 which are in threaded engagement with the terminals 26. This construction affords a secure electrical connection between the meter conductors 6 and the line conductors 30 and may readily be removed, if removal of the meter is found to be necessary, by loosening screws 36.

Sockets 40 formed in bosses in the lower side wall of the terminal chamber as viewed in Fig. 2, are in alignment with the guide pins 10 projecting from the meter base, and are effective when the meter base 2 and the terminal chamber are in telescopic relation, as shown in Fig. 1, to maintain the elements in proper axial relation. When the meter is in its operative or service position, as shown in Fig. 1, a sealing ring 42 engaging the peripheral edges of the meter base and terminal box is effective to maintain the parts in tight dust-proof relation. A usual lead wafer and wire, not shown, may be employed to discourage unauthorized removal of the meter. This method of sealing the parts may be similar to that shown in the aforesaid Patent 1,893,177.

Additional sockets 44 are provided in bosses formed on the upper portion of the side wall of the terminal box in vertical alignment with the apertures 40 in the lower half of the box, and spaced horizontally a distance corresponding to the distance between the pins 10 projecting from the meter base. The purpose of these additional sockets 44 is to receive the meter base pins 10 to support the meter in its auxiliary or testing position, as shown in Fig. 3, to afford access to the terminal chamber, so that necessary connections may be made to the terminal block for the testing operation.

From the foregoing, it should be obvious that during normal service conditions, with the parts as shown in Fig. 1, the assembly presents a neat appearance utilizing a minimum of wall space and that by merely removing the sealing ring 42, withdrawing the meter casing a slight amount to permit the pins 10 to clear the sockets 40, the meter may readily be placed in its testing position, as shown in Fig. 3, and the test thereof may be carried on in a convenient manner. When it is desired to remove the meter from the installation, the terminal screws 36 may be loosened and the terminal clips 8 on the meter conductors 6 may readily be removed.

Quite obviously various modifications may be made in the invention without departing from the spirit and scope thereof, and we desire, therefore, that only such limitations be placed thereon as are imposed by the prior art or recited in the appended claims.

We claim as our invention:

1. An electric meter installation comprising in combination, a terminal box substantially of cup-shape adapted to be secured to a support, a casing for a meter element proportioned to constitute a closure for said terminal chamber, positioning means on said casing and complementary means in said box for maintaining the casing and box in operative position, conductors extending from the base of said casing within said box, a terminal block within said box having terminals for receiving the free ends of said conductors, and additional means in said box complementary to the positioning means on said casing for supporting said casing in an off-set position with respect to said box to give access to said terminal block.

2. In combination, a casing for an electrical instrument having conductors extending from the base thereof and guide means secured to said base, a terminal box having an opening proportioned to be closed by said instrument casing when the latter is in operative position, a terminal block secured in said box for receiving the free ends of said conductors, and a plurality of guide means in said box complementary to the guide means on the base of said casing, said guide means in the terminal box being so disposed that certain of them engage the guide means on said base to support said instrument casing in operative position, and others of said guide means being disposed to support said casing in a position to afford access to said terminal bloc 3. A meter installation comprising a casing for a meter element having flexible conductors extending from the base thereof and a pair of guide pins extending from said base, a terminal box substantially of cup-shape and proportioned to be closed by said meter casing, a terminal block in said box adapted to receive the ends of said conductors, a pair of sockets formed in said box to receive said guide pins, means for securing said casing and box in operative position with said pins disposed in said sockets, and a second pair of sockets in said box for receiving said pins to support said casing in an off-set position with respect to said box.

WILLIAM M. BRADSHAW.
WALTER G. MYLIUS.